Patented Oct. 21, 1941

2,259,961

UNITED STATES PATENT OFFICE 2,259,961

PROCESS FOR DEWAXING CATALYSTS

William Whalley Myddleton, New Malden, England, assignor, by mesne assignments, to The M. W. Kellogg Company, Jersey City, N. J., a corporation of Delaware No Drawing. Application August 26, 1937, Serial No. 161,105. In Great Britain May 21, 1937

6 Claims. (Cl. 260—449)

This invention relates to catalyst and catalytic processes and has for its object to provide an improved method for maintaining the activity of such catalysts and the efficiency of catalytic processes at a high level more particularly it comprises an improved method of removal of high molecular weight hydrocarbons such as waxes from a catalytic surface and/or a catalyst mass or bed.

In processes for the production of hydrocarbons by the reaction in the presence of a catalyst of gaseous mixtures containing hydrogen and carbon monoxide and/or carbon dioxide, the products of the reaction comprise not only the required liquid hydrocarbons but also gaseous and solid hydrocarbons. For example, a gaseous mixture composed of 48% hydrogen; 41% carbon monoxide and 11% inert gases, all on a volume basis, passed at 394° F. and substantially atmospheric pressure, over a catalyst composed of nickel and the oxides of manganese and aluminium on kieselguhr yielded 109 grams of product per cubic meter. This product, on analysis, was composed mainly of hydrocarbons ranging from the normally gaseous paraffins, such as ethane and propane, to higher molecular weight liquid having a final boiling point of above 700° F. The material remaining after distillation was waxy. The hydrocarbons which are gaseous and liquids at ordinary temperatures and pressures are removed with the unconverted gases and are easily separated, but the solid hydrocarbons, or waxes, tend to deposit on the catalyst and/or in the catalytic bed or mass and block the active surface of the catalyst. It is therefore necessary to interrupt the process from time to time and to remove from the catalytic bed the waxes and other difficultly volatile materials which have deposited upon it. It will be understood that in describing this invention the term "wax and difficultly volatile materials" is used to denote any hydrocarbon or other residue, not excluding oxygen-containing compounds such as fatty acids, which are not normally substantially removed from the catalyst surface or mass during the ordinary course of the reaction. In referring to the process of removing the wax and difficultly volatile materials the term "dewaxing" is used inclusively to cover the removal of both true waxes and other difficultly volatile materials. In the claims the expressions "wax" and "relatively non-volatile materials" are to have the meanings as just defined.

Hitherto the method usually adopted for effecting this "dewaxing" of the catalyst has involved allowing the catalytic bed to cool down from its working temperature of approximately 392° F. to a temperature in the neighbourhood of 212° F., the wax and/or difficultly volatile materials being then extracted by means of a liquid solvent. The time occupied in "dewaxing" by this method, including the time required for cooling and re-starting, amounts to a substantial portion of the operating time; i. e., one to four days, and as it is found necessary to effect "dewaxing" at intervals of from one to six weeks the time thus lost has a serious effect on production. The object of the present invention is to provide a method of "dewaxing" the catalyst which will avoid so large a loss of working time and which will maintain the activity of the catalyst at a substantially higher level than is customary when other methods of "dewaxing" the catalyst are employed.

According to this invention "dewaxing" of the catalyst is effected at the working temperature, so that the loss of time due to cooling down and re-starting is substantially eliminated. The method of working which I prefer to adopt comprises two different "dewaxing" operations which are employed at different intervals of time, but I may make use of either of these operations alone.

In the preferred method of working I interrupt the reaction every two or three days and without cooling down the catalytic bed I pass through it a stream of suitably preheated hydrogen, nitrogen or other gas, which gas or gaseous mixture may be chemically inert to both the catalyst and the material to be removed and thereby functions simply as a vehicle for effecting volatilisation of the waxy materials or optionally may be so chosen that in addition to its volatilising function it also acts chemically on the catalyst specifically to increase or restore the activity of the catalyst for the desired reactions. For example, it has been found that where the gas used for volatilisation of the wax contains hydrogen, a degree of activation of the catalyst takes place during the passage of the gas over the catalyst. The greater part of the wax volatilises and is carried off by the gas stream. It will be understood that the time intervals given for the several processes described may vary somewhat depending on the operating conditions employed and the type of hydrocarbon synthesis being effected.

The essential characteristic of the gas or gas mixture is that it acts as a volatilising agent and does not itself undergo a catalytic reaction, with the possible exception of the above mentioned activating action on the catalyst itself. The gas or gas mixture having such characteristic will be called inert gas hereafter and in the following claims.

At longer intervals (of, say, a month) I remove substantially the whole of the wax and/or difficultly volatile material on the catalyst and catalyst mass by interrupting the reaction and passing through the catalytic bed a liquid solvent, which has been heated to a suitable temperature, for the wax which solvent has a boiling point substantially equal to, or preferably rather above, the working temperature of the catalyst. By the use of such a solvent I am able to extract the wax without cooling down the catalyst to any substantial extent; the solvent does not boil or boils only very gently so that there is no disturbance of the catalytic bed. The working temperature of certain catalysts now employed for hydrocarbon syntheses is initially about 375° F. and during a given cycle of operation is gradually increased to about 410° F. Under these circumstances it is therefore convenient to employ for this second dewaxing operation a solvent having an initial boiling point in the neighbourhood of 420° F. and a final boiling point of about 600° F. However it must be understood that these temperatures are by way of illustration and in practise may be considerably different from those given—the important consideration being that the initial boiling point of the solvent should preferably but not necessarily be ten to fifteen degrees higher than the working temperature of the catalyst when the solvent is applied. Indeed in the case where the catalyst consists of metal particles or turnings and where disturbance of the catalyst mass by ebullition of the solvent is less likely than where the catalyst particles are less dense, a solvent may be chosen the initial boiling point of which does not lie above the working temperature of the catalyst and in such cases the critical characteristics of the solvent will consist in that it may be chemically inert to the catalyst and be miscible with the materials to be removed from the catalyst and/or catalyst mass. A suitable solvent is supplied by the appropriate fraction of the hydrocarbon oils produced by the process in which the catalyst is employed, since these oils are free from the catalyst poisons which are often present in otherwise suitable commercially available solvents, but the practise of this invention is not restricted to a solvent consisting of oils produced in the process because other solvents may be treated in such a way as to be rendered suitable. Moreover a suitable solvent may consist of a single compound the boiling point of which is slightly above the working temperature of the catalyst. Thus, for example, solvent containing sulfur may be treated to substantially remove this sulfur since the same acts as a poison to many catalytic materials. It will be understood that various modifications may be made in the process—thus, for example, instead of applying several gas treatments at relatively short intervals between two solvent treatments, the gas and solvent treatments may follow alternately.

This invention is not to be limited by any theory but only by the following claims in which it is my intention to claim all novelty inherent in the invention.

What I claim and desire to secure by Letters Patent is:

1. The process of removing, in a catalytic reaction, from the catalyst surface relatively non-volatile material which has accumulated thereon—which comprises interrupting the reaction at selected intervals, passing over the catalyst a relatively non-volatile liquid while the catalyst is substantially at reaction temperature, said liquid having a higher initial boiling point than the reaction temperature, and continuing the reaction.

2. In the process of manufacturing hydrocarbons from a mixture consisting principally of carbon-monoxide and hydrogen in the presence of a granular catalyst, the improvement which comprises interrupting the reaction at predetermined intervals, removing the relatively non-volatile material during such interruption by passing over the catalyst a solvent for said material while the catalyst is substantially at the reaction temperature, said solvent being at a temperature higher than the reaction temperature, and continuing the reaction.

3. The process according to claim 2 in which the solvent consists of an appropriate fraction of the hydrocarbons produced in the reaction.

4. The process according to claim 2 in which the solvent has been pre-treated in order to remove catalyst poisons.

5. A process as in claim 2 in which said solvent has an initial boiling point higher than the reaction temperature.

6. The process of removing in a catalytic reaction from the catalyst surface relatively non-volatile material consisting of hydrocarbons boiling above 500° F. accumulated thereon, which comprises interrupting the reaction at selected intervals, passing over the catalyst an inert fluid heated substantially to the operating condition of the catalyst, and continuing the reaction.

WILLIAM WHALLEY MYDDLETON.